US012579392B2

(12) United States Patent
Vitto et al.

(10) Patent No.: US 12,579,392 B2
(45) Date of Patent: Mar. 17, 2026

(54) COMPUTER-IMPLEMENTED SYSTEM FOR IMAGE QUALITY ENHANCEMENT AND COLOR SPACES CONVERTION FOR MANUFACTURED SURFACES PRINTERS

(71) Applicant: DIGITAL DESIGN S.R.L., Fiorano Modenese (IT)

(72) Inventors: Alberto Vitto, Fiorano Modenese (IT); Fabio Lanzi, Fiorano Modenese (IT); Simone Calderara, Fiorano Modenese (IT); Rita Cucchiara, Fiorano Modenese (IT); Andrea Mariani, Fiorano Modenese (IT); Elena Pellesi, Fiorano Modenese (IT)

(73) Assignee: DIGITAL DESIGN S.R.L., Fiorano Modenese (IT)

( * ) Notice: Subject to any disclaimer, the term of this patent is extended or adjusted under 35 U.S.C. 154(b) by 30 days.

(21) Appl. No.: 18/555,310

(22) PCT Filed: Apr. 12, 2022

(86) PCT No.: PCT/IB2022/053403
§ 371 (c)(1),
(2) Date: Oct. 13, 2023

(87) PCT Pub. No.: WO2022/219511
PCT Pub. Date: Oct. 20, 2022

(65) Prior Publication Data
US 2024/0193390 A1 Jun. 13, 2024

(30) Foreign Application Priority Data
Apr. 14, 2021 (IT) ........................ 102021000009317

(51) Int. Cl.
*H04N 1/60* (2006.01)
*G06F 3/12* (2006.01)
*G06K 15/02* (2006.01)

(52) U.S. Cl.
CPC ....... *G06K 15/1859* (2013.01); *G06K 15/027* (2013.01); *G06K 15/1822* (2013.01)

(58) Field of Classification Search
None
See application file for complete search history.

(56) References Cited

U.S. PATENT DOCUMENTS 9,497,356 B1* 11/2016 Pjanic ................ H04N 1/32256
2003/0219155 A1* 11/2003 Azuma .................. B44D 3/003
382/156

(Continued)

FOREIGN PATENT DOCUMENTS

JP 2002314824 * 10/2002 ............. B41J 2/525
JP 2008103871 * 5/2008 ............... G06T 1/00

OTHER PUBLICATIONS

Abet S et al: "A neural network approach for RGB to YMCK color conversion", TENCON '94. IEEE Region 10'S Ninth Annual International Conference. TH EME: Frontiers of Computer Technology. Proceedings of 1994 Singapore Aug. 22-26, 1994, New York, NY, USA, IEEE, Aug. 22, 1994, pp. 6-9, XP010126996.

(Continued)

*Primary Examiner* — Beniyam Menberu
(74) *Attorney, Agent, or Firm* — ASLAN LAW, P.C.

(57) ABSTRACT

A computer-implemented system for image quality enhancement and color spaces conversion for manufactured surfaces printers comprises at least a convolutional neural network, configured for executing at least the following steps: receive in input an original image x' in RGB space; from the original image x', elaborate an approximation $\tilde{x}_+''$ in multichannel space or in RGB space of an enhanced image $x_+''$ for (Continued)

manufactured surfaces printers; and return to output the approximation $\tilde{x}_+''$ of the enhanced image $x_+''$ for the use in manufactured surfaces printers.

10 Claims, 3 Drawing Sheets

(56) References Cited

U.S. PATENT DOCUMENTS

| | | | |
|---|---|---|---|
| 2005/0128498 A1* | 6/2005 | Matsuzaki | H04N 1/603 |
| | | | 358/1.9 |
| 2017/0187925 A1* | 6/2017 | Sawada | H04N 1/6072 |
| 2019/0005603 A1* | 1/2019 | Chen | G06N 3/048 |
| 2021/0201071 A1* | 7/2021 | Liao | G06T 11/001 |

OTHER PUBLICATIONS

Sean Moran et al: "DIRAR: Deep Image Formation and Retouching", arxiv.org, Cornell University Library, 201 Olin Library Cornell University Ithaca, NY 14853, Nov. 29, 2019, XP081542121, 24 pages.

* cited by examiner

COMPUTER-IMPLEMENTED SYSTEM FOR IMAGE QUALITY ENHANCEMENT AND COLOR SPACES CONVERTION FOR MANUFACTURED SURFACES PRINTERS

CROSS-REFERENCE TO RELATED APPLICATIONS

This application claims priority to IT Patent Application No. 102021000009317 filed on Apr. 14, 2021, and this application claims priority to and is a 371 of international PCT Application No. PCT/IB2022/053403 filed on Apr. 12, 2022, the entire contents of which are hereby incorporated by reference.

TECHNICAL FIELD

The present invention relates to a computer-implemented system for image quality enhancement and color spaces conversion for manufactured surfaces printers, particularly for tiles decoration printers.

BACKGROUND ART

It is known that color management is the process that controls how color is used and represented across different devices, such as monitors, scanners or printers.

It often happens that the same color has a different outlook depending on the device is being visualized: color management tries to mitigate this effect.

The general principle, common to the various digital color management technologies, consists in assigning to each peripheral (monitor, scanner, printer) a so-called color profile that indicates its chromatic characteristics. Each image produced by a scanner or digital camera is associated with the color profile of the peripheral, which associates the relative chromatic coordinates to the peripheral coordinates. When the image is sent to a monitor or printer, the color management system calculates a color conversion between the input image profile and the output device profile so that the colorimetric coordinates of the input colors match the colorimetric coordinates of the output device. This ensures that the original colors and the colors of the printed or displayed image match.

It is also known that is mandatory to operate the correct management of colors for manufactured surfaces designing and decoration, because manufactured surfaces must have very specific properties, depending on the context and situation they will be used; for instance, colors should be warmer, brighter, colder or more vivid.

Concerning manufactured surfaces designing and decoration, the process starts from the scan of very large surfaces (from marble to wood to abstract surfaces) generating super high resolution RGB images, usually saved in tiff format.

Then the obtained images are manipulated inside Photoshop: first they are converted in psb proprietary format using custom color profiles necessary to communicate with industrial printers, second these converted images are enhanced in a way that the output outlook after printing is as better as possible, depending on the context. Custom color profiles play a key role in this procedure because they affect the perceptual aspect of colors in different surfaces and are necessary to the printers they work with: instead, these specific printers work with particular multichannel output color profiles that map images in multichannel spaces, from the well-known CMYK to more complex five or six-channel spaces.

The conversion of images in these multichannel spaces is lossy, meaning that often it cannot reproduce the full range of color present in the initial high resolution RGB scan. The sensibility and experience of the designer are required to try to preserve and enhance color properties as they are asked from the customers. The process of conversion is automatized by Photoshop but the most difficult part, the enhancement, it is manually done through complex procedures like simulating the actual rendering of the surface once it will be printed in production.

Therefore, there was the need for a semi-automatic tool that would take care of the enhancement process, leaving the conversion to Photoshop.

DESCRIPTION OF THE INVENTION

The main aim of the present invention is to provide a computer-implemented system for image quality enhancement and color spaces conversion for manufactured surfaces printers that allow to automatically perform the enhancement and conversion process, effectively, quickly and reliably, in order to obtain images printed on the manufactured surface that are as close as possible to the initial scanned images considering the available color profile.

The above-mentioned objects are achieved by the present computer-implemented system for image quality enhancement and color spaces conversion for manufactured surfaces printers according to the features of claim 1.

BRIEF DESCRIPTION OF THE DRAWINGS

Other characteristics and advantages of the present invention will become better evident from the description of a preferred, but not exclusive embodiments of a computer-implemented system for image quality enhancement and color spaces conversion for manufactured surfaces printers, illustrated by way of an indicative but non-limiting example in the accompanying Figures, in which.

EMBODIMENTS OF THE INVENTION

Figure 1:
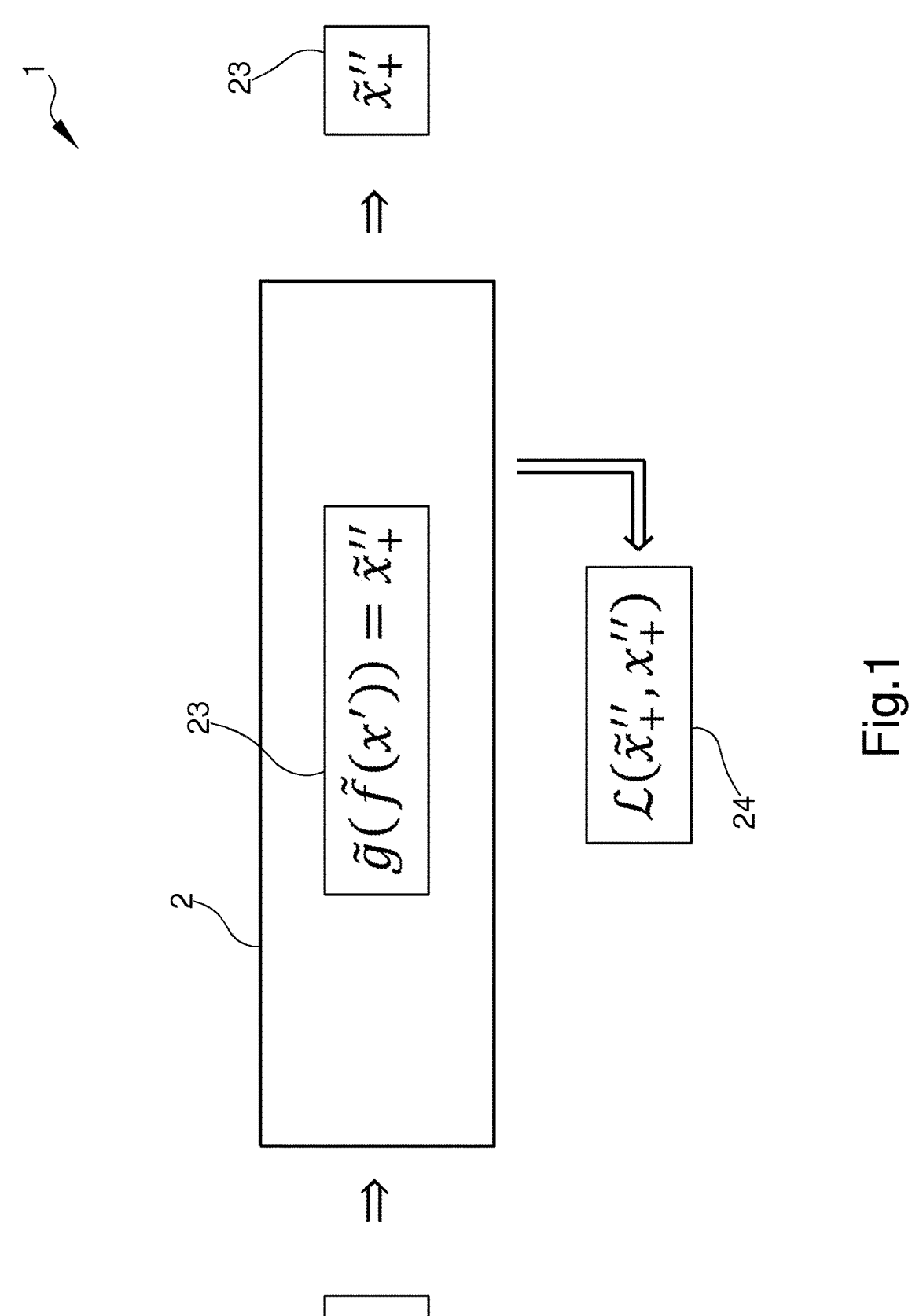
FIG. 1 shows a first possible embodiment of the computer-implemented system according to the invention.
Figure 2:
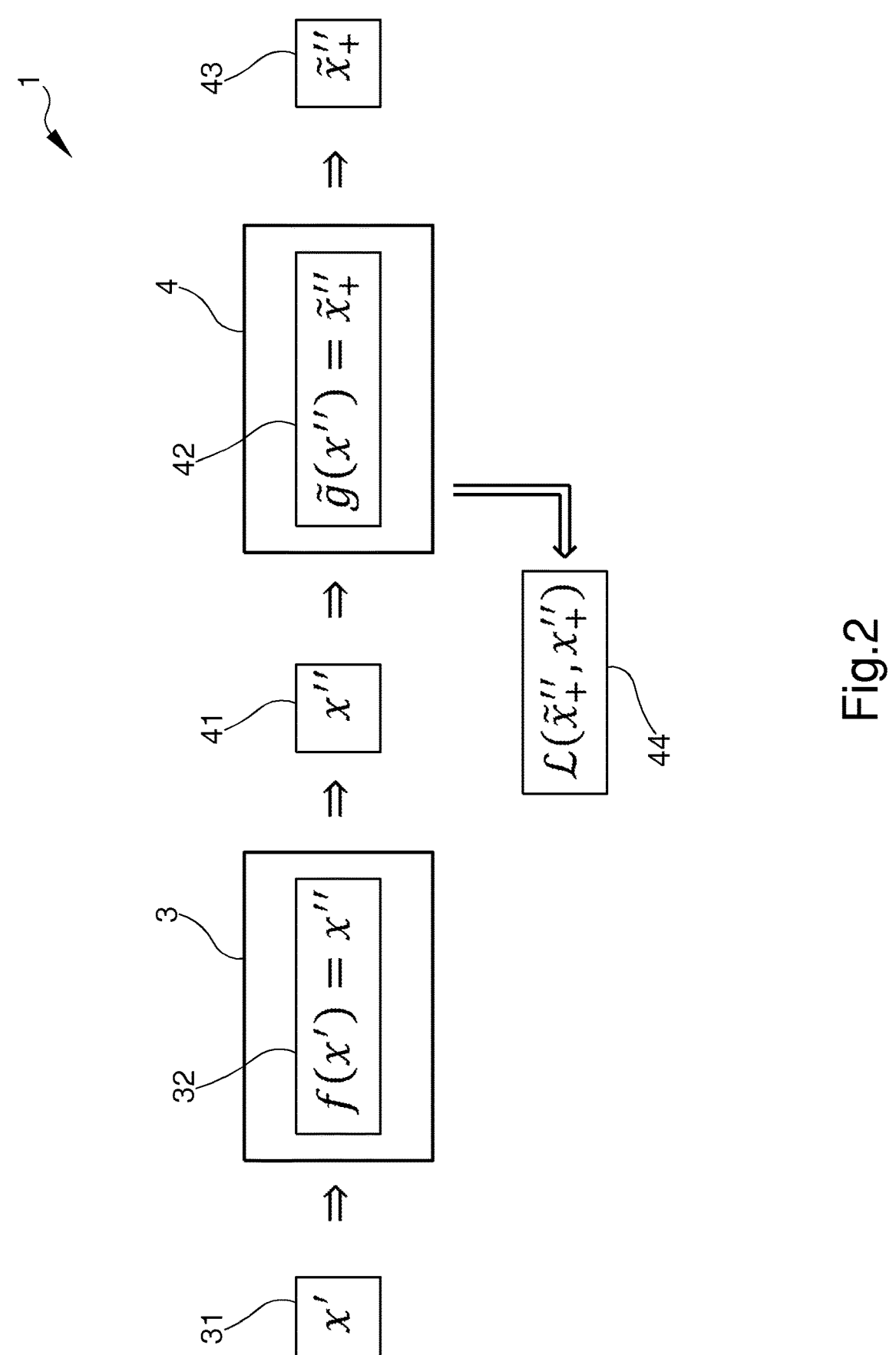
FIG. 2 shows a second possible embodiment of the computer-implemented system according to the invention.
Figure 3:
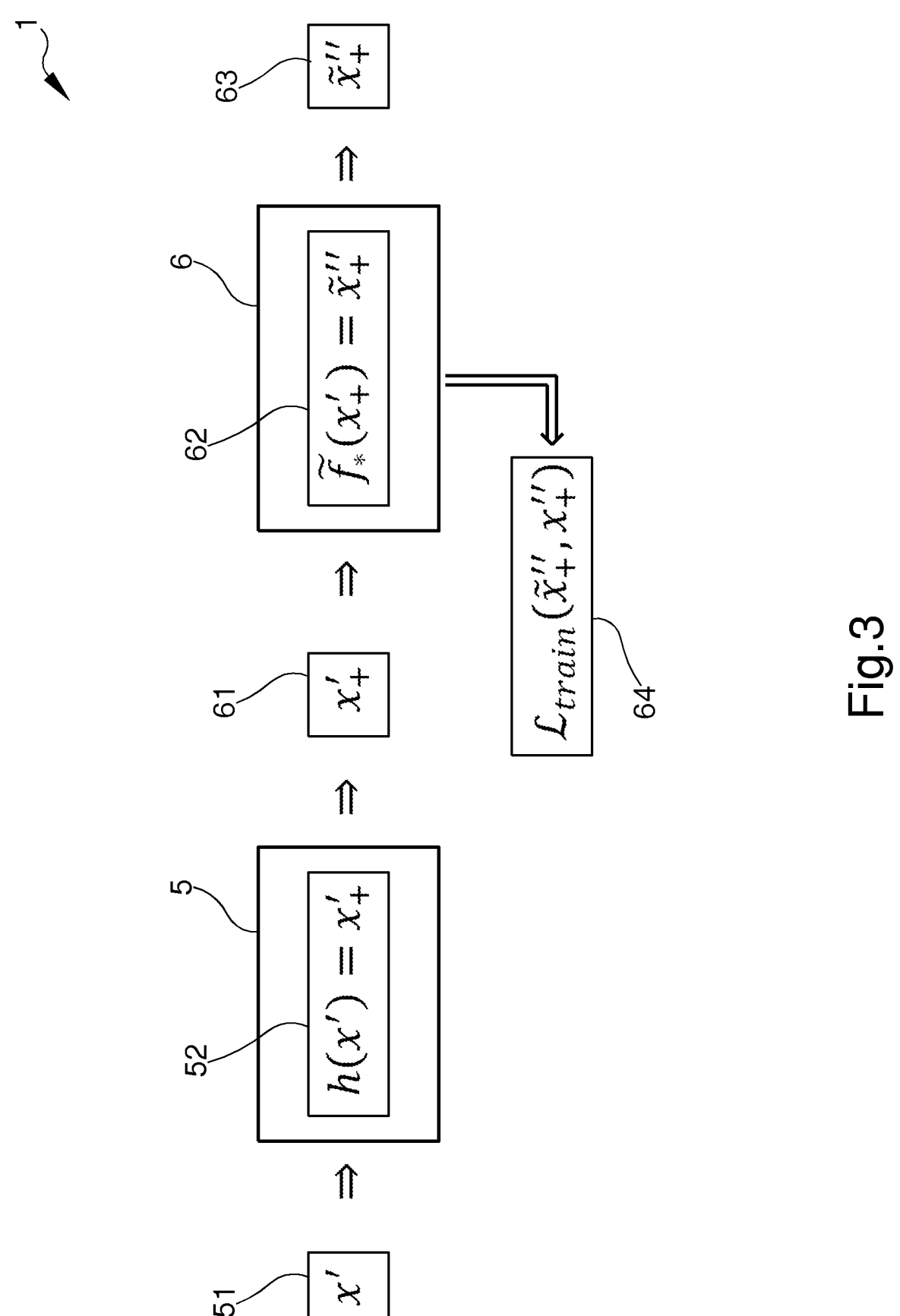
FIG. 3 shows a third possible embodiment of the computer-implemented system according to the invention.

With particular reference to such illustrations, globally indicated with reference 1 is a computer-implemented system for image quality enhancement and color spaces conversion for manufactured surfaces printers.

Particularly, the computer-implemented system 1 can be used for tiles decoration printers.

However, it is not excluded the use of the method for the decoration of different types of manufactured surfaces.

Preferably, all the convolutional networks used in the computer-implemented system 1 are based over U-Net. However, the use of different network is not excluded.

As known, U-Net is a fully convolutional network (FCN) that uses only locally connected layers such as convolution, pooling and upsampling. Avoiding dense layers means both less parameters and the ability to work with variable image sizes, given that all connections are local.

The U-Net network consists of two paths:

Contracting path: by decreasing the spatial dimension and increasing channels dimension the information on the global context is maintained via a compact feature map;

Expansive path: information on low-level features, which help in the precise localization of details, is reported thanks to the skip connections.

In order to properly train a deep neural network used by the computer-implemented system 1 according to the invention, there was the need to create a training dataset with as many images as possible.

The provided training dataset comprises images constituted by high resolution surfaces coming from marbles, woods, cements and others hand-drawn abstract surfaces.

Particularly, the computer-implemented system 1 comprises a training dataset with images divided in three groups:

RGB images: initial images that have to be enhanced with a specific color profile.

Converted images: starting from each of the RGB images, a converted image is given by applying the color profile inside Photoshop, with no other actions. According to the present invention, the converted images are obtained from the RGB images by means of dedicated libraries and without the use of Photoshop.

Enhanced images for manufactured surfaces printers: for each of the RGB images an enhanced version of it was provided. These are images which were first converted then manually enhanced by a graphic designer in order to improve visual aspect and highlight the desired detail or color (for instance, highlighting the veins in a marble slab or accentuating shades of a certain color).

The concepts implemented by the computer-implemented system 1 can be mathematically formalized as follows.

A surjective non-invertible conversion function $f$ corresponds to the application of a color profile inside Photoshop. Given a [R, G, B] triple, the conversion function $f$ returns a n-tuple [C1; C2; . . . ; Cn], where n is the number of output channels defined by the color profile.

Actually, the conversion carried out by Photoshop comprises a source space profile (in most cases Adobe RGB 1998) and a destination space profile involved using the CIELAB connection space to make the conversion. Inside each ICC profile Photoshop can find lookup tables that explain the mapping between the profile space and the CIELAB space and vice versa, so between the CIELAB space and the profile space. For instance, converting from multichannel space to Adobe RGB 1998 involves first the lookup table multichannel to CIELAB, then CIELAB to RGB.

An enhancement function g, which represents the enhancement work carried out by the graphic designer once the image has been converted in a multichannel space.

The process implemented by the computer implemented system 1 can be formalized as follows:

$$(g \circ f)(x') = g(f(x')) = g(x'') = x''_+$$

where:

x' is the original image in RGB space;

x" is the converted image in multichannel space;

$x''_+$ is the enhanced image in multichannel space that can be used in manufactured surfaces printers;

$f$ is the conversion function $f(x)=x''$;

g is the enhancement function $g(x'')=x''_+$.

Particularly, according to the invention, the computer-implemented system 1 comprises at least a convolutional neural network configured for executing at least the following steps:

receive in input an original image x' in RGB space;

from the original image x', elaborate an approximation $\tilde{x}_+$" in multichannel space or in RGB space of the enhanced image $x_+$" for manufactured surfaces printers;

return to output the approximation $\tilde{x}_+$" of the enhanced image $x_+$".

According to a first possible embodiment, schematically showed in FIG. 1, the computer-implemented system 1 comprises a convolutional neural network 2 implementing an approximation $\tilde{f}$ of the conversion function $f$ and an approximation $\tilde{g}$ of the enhancement function g, wherein the conversion function $f$ is a function that converts an original image x' in RGB space in a converted image x" in multichannel space [C1; C2; . . . ; Cn], where n is the number of output channels defined by a color profile, and wherein the enhancement function g represents the enhancement work carried out by a graphic designer on the converted image x" in the multichannel space for obtaining an enhanced image $x_+$" in multichannel space for the use with manufactured surfaces printers.

Furthermore, the convolutional neural network 2 is configured for executing the following steps:

receive in input an original image x' in RGB space (step 21);

elaborate an approximation $\tilde{x}$" of the converted image x" in multichannel space from the original image x' by means of the approximation $\tilde{f}$ of the conversion function $f$, wherein $\tilde{f}(x')=\tilde{x}$" (step 22);

elaborate an approximation $\tilde{x}_+$" of the enhanced image $x_+$" in multichannel space, from the approximation $\tilde{x}$" of the converted image x" and by means of the approximation $\tilde{g}$ of the enhancement function g, wherein $\tilde{g}(\tilde{x}")=\tilde{x}_+$" (step 22);

return to output the approximation $\tilde{x}_+$" of the enhanced image $x_+$" (step 23).

Furthermore, according to the first embodiment, the computer implemented system 1 is configured for executing a loss function $\mathcal{L}(\tilde{x}_+", x_+")$, used to train the network between ground truth enhanced image $x_+$" and predicted enhanced image $\tilde{x}$" (step 24).

Therefore, according to the first embodiment, both $f$ and g are approximated with a deep neural network 2 that takes as input an original image x' in RGB space and outputs an approximation $\tilde{x}_+$" of the enhanced image $x_+$" in multichannel space.

The model implemented by the convolutional neural network 2 according to the first embodiment can be summarized by the following expression:

$$x' \Rightarrow (\tilde{g} \circ \tilde{f})(x') \Rightarrow \tilde{g}(\tilde{f}(x')) \Rightarrow \tilde{g}(\tilde{x}") \Rightarrow \mathcal{L}(\tilde{x}_+", x_+")$$

According to a second possible embodiment, the computer-implemented system 1 comprises a conversion unit 3 configured for execute the following steps:

receive in input an original image x' in RGB space (step 31), and elaborate a converted image x" in multichannel space from the original image x' by means of the conversion function $f$, wherein $f(x')=x$" (step 32).

Furthermore, according to the second embodiment, the computer-implemented system 1 comprises a convolutional neural network 4 implementing an approximation $\tilde{g}$ of the enhancement function g, wherein the enhancement function g represents the enhancement work carried out by a graphic designer on the converted image x" in the multichannel space for obtaining an enhanced image $x_+$" in multichannel space for the use with manufactured surfaces printers. Particularly, the convolutional neural network 4 is configured for executing the following steps:

receive in input a converted image x" in multichannel (step 41);

elaborate an approximation x̃₊" of the enhanced image x₊" in multichannel space, from the approximation x̃" of the converted image x" and by means of the approximation g̃ of the enhancement function g, wherein g̃(x̃")=x̃₊" (step 42)

return to output the approximation x̃₊" of the enhanced image x₊" (step 43).

Furthermore, according to the second embodiment, the computer-Implemented system 1 is configured for executing a loss function $\mathcal{L}(\tilde{x}_+", x_+")$, used to train the network between ground truth enhanced image x₊" and predicted enhanced image x̃" (step 44).

Therefore, according to the second embodiment, the conversion function f is not approximated because it is applied before giving the image as input to the convolutional neural network.

Particularly, according to a preferred embodiment, the conversion unit 3 is configured for determining a correspondence between each [R;G;B] triplet and multichannel n-tuple. For example, the conversion unit 3 is configured for determining a correspondence between each [R;G;B] triplet and [C1;C2;C3;C4] quadruple referred to the 4-channel profile or [C1;C2;C3;C4;C5] quintuple referred to the 5-channel profile.

Therefore, the conversion unit 3 is able to create a perfect correspondence between a RGB value and its converted multichannel value. Given a [R, G, B] in position (h, w) where 0≤h<4096 and 0≤w<4096, the converted value in a color space is found in the same position (h, w) in the converted image with the desired profile.

The only function that is approximated by means of the convolutional neural network 4 is the enhancement function g that takes as input a converted image x" in multichannel and outputs an approximation x̃₊" of the enhanced image x₊" in multichannel space.

The model implemented by the convolutional neural network 4 according to the second embodiment can be summarized by the following expression:

$$x' \xrightarrow{f} x'' \Rightarrow \tilde{g}(x'') \Rightarrow \mathcal{L}(\tilde{x}''_+, x''_+)$$

With reference to the first and second embodiments, the computer-implemented system 1 further comprises a transformation unit for implementing a fast transform between a multichannel color profile and RGB color profile.

Particularly, according to the first and second embodiments as disclosed above, the computer-implemented system 1 provides an output in multichannel space which was not usable because of the inability to save a multichannel image in .psb format and open it in Photoshop.

Therefore, the transformation unit is configured for implementing a fast transform of said an approximation x" of said enhanced image x" in multichannel space into an RGB color profile.

Particularly, the transformation unit is configured for executing at least the following steps:

convert each value of a source multichannel color profile to its corresponding CIELAB value through the multichannel-to-CIELAB color lookup table inside the source color profile;

then, convert each CIELAB value to its corresponding [R, G, B] value through the CIELAB-to-RGB color lookup table inside the destination RGB color profile.

According to a third possible embodiment, the computer-implemented system 1 comprises a first convolutional neural network 5 implementing an enhancement function over RGB images h, configured for executing the following steps:

receive in input an original image x' in RGB space (step 51);

elaborate an RGB enhanced image x₊' from the original image x' in RGB space and by means of the enhancement function over RGB images h, wherein h(x')=x₊' (step 52).

Furthermore, according to the third embodiment, the computer-implemented system comprises a second convolutional neural network 6 implementing an approximation f̃₊ with a differentiable model of a conversion function f, wherein the conversion function f is a function that converts an original image x' in RGB space in a converted image x" in multichannel space [C1; C2; . . . ; Cn], where n is the number of output channels defined by a color profile, and wherein the second convolutional neural network (6) is configured for executing the following steps:

receive in input the RGB enhanced image x₊' (step 61)

elaborate an approximation x̃₊" in RGB space of the enhanced image x₊", from the RGB enhanced image x₊' and by means of the approximation f̃₊ of the conversion function f, wherein f̃₊(x₊')=x̃₊" (step 62);

return to output the approximation x̃₊" in RGB space of the enhanced image x₊" (step 63).

Furthermore, according to the first embodiment, the computer-implemented system 1 system is configured for executing a loss function $\mathcal{L}(\tilde{x}_+", x_+")$, used to train the network between ground truth enhanced image x₊" and predicted enhanced image x̃" (step 64).

Therefore, according to the first embodiment, the first convolutional neural network 5 implements a new function h which applies an enhancement over an RGB image input image x' and outputs an RGB enhanced image x₊'.

It is important to note that it is assumed that:

$$g(f(x')) \approx f(h(x'))$$

meaning that swapping the two operation conducts to the same result. This approximation is forced to loss level.

Successively, the second convolutional neural network 6 applies the conversion function f̃.

Particularly, the approximation f̃₊ implemented by the second convolutional network 6 approximate the application of the conversion function f with a differentiable model and outputs an RGB image x̃₊" that can be saved in different formats, with the property that, once applied the color profile inside Photoshop, the converted image will look as close as possible to the ground truth enhanced image in multichannel space.

Particularly, this model tackles the need to make a LUT (LookUp Table) differentiable and the conversion function f is nothing but a LUT that, given an [R;G;B] value, returns a [C1; C2; . . . ; Cn] multichannel value, according to a color profile. Intrinsically, a LUT is a non-differentiable step function with derivative 0 everywhere.

According to the third embodiment, two possible modes are defined:

a training mode, where e f̃₊ is the approximation of f, necessary to allow backpropagation of gradient and imported as a pretrained model with freezed weights;

a test mode, where f̃₊ is no longer needed because true f is directly applied inside Photoshop.

The better approximation of e $\tilde{f}_* \simeq f$, the better results in test mode.

The model in training mode implemented by the convolutional neural networks 5, 6 according to third embodiment can be summarized by the following expression:

$$x' \Rightarrow (\tilde{f}_* \circ h)(x') \Rightarrow \tilde{f}_*(h(x')) \Rightarrow \tilde{f}_*(x_+') \Rightarrow \mathcal{L}_{train}(\tilde{x}_+'',x_+'')$$

where:

h: enhancement function in RGB space;

$\tilde{f}_*$: approximation of the conversion function;

$\mathcal{L}_{train}$: loss used in train mode. Require $\tilde{f}_*$ to be differentiable.

The model in testing mode implemented by the convolutional neural networks 5, 6 according to third embodiment can be summarized by the following expression:

$$x' \Rightarrow (f \circ h)(x') \Rightarrow f(h(x')) \Rightarrow f(x_+') \Rightarrow \mathcal{L}_{test}(\tilde{x}_+'',x_+'')$$

where:

h: enhancement function in RGB space;

f: true conversion function;

$\mathcal{L}_{test}$: loss used in test mode.

In the following section is described how first, second and third embodiment can be implemented.

Functions $\tilde{f}$, $\tilde{g}$ and h have been approximated with a convolutional network based over U-Net.

With reference to the first embodiment, the convolutional neural network 2 of the computer-implemented system 1 has been implemented using a U-Net where the input is a RGB image and the output is a multichannel enhanced image.

For example, the network can be trained with 17264 train images (80% of the total) and 4316 evaluation images (20% of the total), using as train loss a weighted sum of SSIM and L2 defined as $$\mathcal{L}_{train}(\tilde{x}_+'',x_+'')=0.1 \cdot SSIM(\tilde{x}_+'',x_+'')+L2(\tilde{x}_+'',x_+'')$$

where:

SSIM (Structural Similarity Index Measure): measurement of image quality that considers three key features, namely luminance, contrast and structure over a window of pixels;

L2 (also called L2-norm or Mean Squared Error): pixel-by-pixel measure defined as the average squared difference between the estimated values and the actual value. This forces precision at pixel level.

With reference to the second embodiment, the computer-implemented system 1 has been essentially implemented in the same way of the first embodiment; the only difference is that the input of the network is an already converted image in the destination profile space, while the output remains a multichannel enhanced image.

With reference to the third embodiment, for the implementation of the differentiable function f by the second convolutional neural network 6 is fundamental learning the conversion that is done inside Photoshop when a color profile is assigned. Once the learning it is done, the model is imported pretrained with freezed weights. In doing so, the network is able to simulate the application of the specific color profile and can adjust the RGB image giving it particular properties in such a way that, once the real color profile will be applied during usage phase, the image will become the enhanced one, instead of a simple converted one.

The model according the third embodiment, like the others, has been implemented with a U-Net.

In order to properly learn the LUT (Look Up Table) of each profile, i.e. the conversion RGB to MULTICHANNEL, the original dataset, used for training the other models, can be extended with images belonging to COCO dataset (Common Object in Context) by Microsoft.

Next step is to create the actual correspondence between [R G;B] triplet and multichannel n-tuple, for example [C1; C2;C3;C4] quadruple referred to the 4 channels profile and [C1;C2;C3;C4;C5] quintuple referred to the 5 channels profile.

By doing so, it is possible to create a perfect correspondence between a RGB value and its converted multichannel value. Given a [R, G, B] in position (h, w) where $0 \leq h < 4096$ and $0 \leq w < 4096$, the converted value in color space C is found in the same position (h;w) in the converted image with the desired profile.

To properly train the model, for each RGB image, the ground truth is the converted image according to the LUT defined above.

Therefore, according to the third embodiment, the first convolutional neural network 5 is implemented with a U-Net which takes as input a RGB image and outputs a RGB enhanced image.

The first convolutional neural network 5 is then concatenated with the second convolutional neural network 6, the pretrained LUT model with freezed weights, also based on U-Net, which takes as input the RGB enhanced image and outputs a converted enhanced image which should be as close as possible to the real one.

In testing mode, the second branch of the network is not used and an RGB enhanced image is output and saved; then the user can take this image and apply, inside Photoshop, the desired color profile.

In practice it has been found that the invention achieves the intended aim and objects.

In particular, the computer-implemented system according to the invention automatically perform image quality enhancement and color spaces conversion for manufactured surfaces printers, effectively, quickly and reliably, in order to obtain images printed on the manufactured surface that are as close as possible to the initial scanned images considering the available color profile.

The invention claimed is:

1. A computer-implemented system for image quality enhancement and color spaces conversion for images to be printed on manufactured surfaces, wherein the process implemented by the computer implemented system 1 is as follows:

$$(g \circ f)(x') = g(f(x')) = g(x'') = x_+''$$

where:

x' is the original image in RGB space;

x" is the converted image in multichannel space;

$x_+''$ is the enhanced image in multichannel space that can be used in manufactured surfaces printers;

f is the conversion function f(x')=x";

g is the enhancement function g(x")=$x_+''$ that represents the enhancement work carried out by a graphic designer on the converted image x" in the multichannel space for obtaining an enhanced image $x_+''$ in multichannel space for the use with said manufactured surfaces printers, wherein the computer-implemented system comprising at least a convolutional neural network trained by means of a training dataset with images divided in three groups:

initial RGB images that have to be enhanced with a specific color profile multichannel space that can be used in said manufactured surfaces printers, converted images starting from each of said RGB images, by applying said color profile; and for each of the RGB images, an enhanced version of said converted images by applying said color profile, wherein said convolutional neural network configured for executing at least the following steps:

receive in input an original image x' in RGB space;

from the original image x', generate an approximation $\tilde{x}_+$" of an enhanced image $x_+$" in said specific color profile multichannel space for said manufactured surfaces printers; and return to output said approximation $\tilde{x}_+$" of the enhanced image $x_+$" for the use in said manufactured surfaces printers.

2. The computer-implemented system according to claim 1, further comprising: a convolutional neural network implementing an approximation $\tilde{f}$ of a conversion function $f$ and an approximation $\tilde{g}$ of an enhancement function g, wherein said conversion function $f$ is a function that converts an original image x' in RGB space to a converted image x" in multichannel space [C1; C2; . . . ; Cn], where n is the number of output channels defined by a color profile, wherein said enhancement function g represents the enhancement work carried out by a graphic designer on the converted image x" in the multichannel space for obtaining said enhanced image $x_+$" in multichannel space for the use with said manufactured surfaces printers, and wherein said convolutional neural network is configured for executing the following steps:

receive in input said original image x' in RGB space;

generate an approximation $\tilde{x}$" of said converted image x" in multichannel space from said original image x' by means of said approximation $\tilde{f}$ of the conversion function $f$, wherein $\tilde{f}(x')=\tilde{x}$";

generate an approximation $\tilde{x}_+$" of said enhanced image $x_+$" in multichannel space, from said approximation $\tilde{x}$" of the converted image x" and by means of said approximation $\tilde{g}$ of the enhancement function g, wherein $\tilde{g}(\tilde{x}")=\tilde{x}_+$"; and return to output said approximation $\tilde{x}_+$" of the enhanced image $x_+$".

3. The computer-implemented system according to claim 1, further comprising: a conversion unit configured for execute the following steps:

receive in input said original image x' in RGB space, and from said original image x', generate a converted image x" in multichannel space [C1; C2; . . . ; Cn], where n is the number of output channels defined by a color profile, by means of a conversion function $f$, wherein $f(x')=x$"; and a convolutional neural network implementing an approximation $\tilde{g}$ of an enhancement function g, wherein said enhancement function g represents the enhancement work carried out by a graphic designer on the converted image x" in the multichannel space for obtaining said enhanced image $x_+$" in multichannel space for the use with said manufactured surfaces printers, and wherein the convolutional neural network is configured for executing the following steps:

receive in input said converted image x" in multichannel;

generate an approximation $\tilde{x}_+$" of said enhanced image $x_+$" in multichannel space, from said approximation $\tilde{x}$"

of the converted image x" and by means of said approximation $\tilde{g}$ of the enhancement function g, wherein $\tilde{g}(\tilde{x}")=\tilde{x}_+$"; and return to output said approximation $\tilde{x}_+$" of the enhanced image $x_+$".

4. The computer-implemented system according to claim 3, wherein said conversion unit is constituted by a Photoshop conversion function.

5. The computer-implemented system according to claim 1, further comprising: a transformation unit for implementing a fast transform between a multichannel color profile and RGB color profile.

6. The computer-implemented system according to claim 5, wherein said transformation unit is configured for implementing a fast transform of said an approximation $\tilde{x}_+$" of said enhanced image $x_+$" in multichannel space into an RGB color profile.

7. The computer-implemented system according to claim 6, wherein said transformation unit is configured for executing at least the following steps:

convert each value of a source multichannel color profile to its corresponding CIELAB value through the multichannel-to-CIELAB color lookup table inside the source color profile; and then, convert each CIELAB value to its corresponding [R, G, B] value through the CIELAB-to-RGB color lookup table inside the destination RGB color profile.

8. The computer-implemented system according to claim 1, further comprising: a first convolutional neural network implementing an enhancement function h over RGB images, configured for executing the following steps:

receive in input said original image x' in RGB space;

generate an RGB enhanced image $x_+$" from the original image x' in RGB space and by means of the enhancement function over RGB images h, wherein $h(x')=x_+$'; and a second convolutional neural network implementing an approximation $\tilde{f}_*$ with a differentiable model of a conversion function $f$, wherein said conversion function $f$ is a function that converts an original image x' in RGB space to a converted image x" in multichannel space [C1; C2; . . . ; Cn], where n is the number of output channels defined by a color profile, and wherein said second convolutional neural network (6) is configured for executing the following steps:

receive in input said RGB enhanced image $x_+$';

generate an approximation $\tilde{x}_+$" in RGB space of said enhanced image $x_+$", from said RGB enhanced image $x_+$' and by means of said approximation $\tilde{f}_*$ of the conversion function $f$, wherein $\tilde{f}(x_+')=\tilde{x}_+$"; and return to output said approximation $\tilde{x}_+$" in RGB space of the enhanced image $x_+$".

9. The computer-implemented system according to claim 8, wherein $g(\tilde{f}(x'))\simeq\tilde{f}(h(x'))$, wherein h enhancement function over RGB images, $f$ is said function that converts an original image x' in RGB space to a converted image x" in multichannel space, and g is an enhancement function that represents the enhancement work carried out by a graphic designer on the converted image x" in a multichannel space for obtaining an enhanced image x" in multichannel space for the use with said manufactured surfaces printers.

10. The computer-implemented system according to claim 1, further comprising: executing a loss function $\mathcal{L}(\tilde{x}_+",x_+")$, used to train the at least a convolutional neural network between ground truth enhanced image $x_+''$ and approximated enhanced image $\hat{x}''$.

\* \* \* \* \*